April 26, 1938.   G. T. COOKE   2,115,506
BRAKE BEAM HANGER DEVICE
Filed June 30, 1937
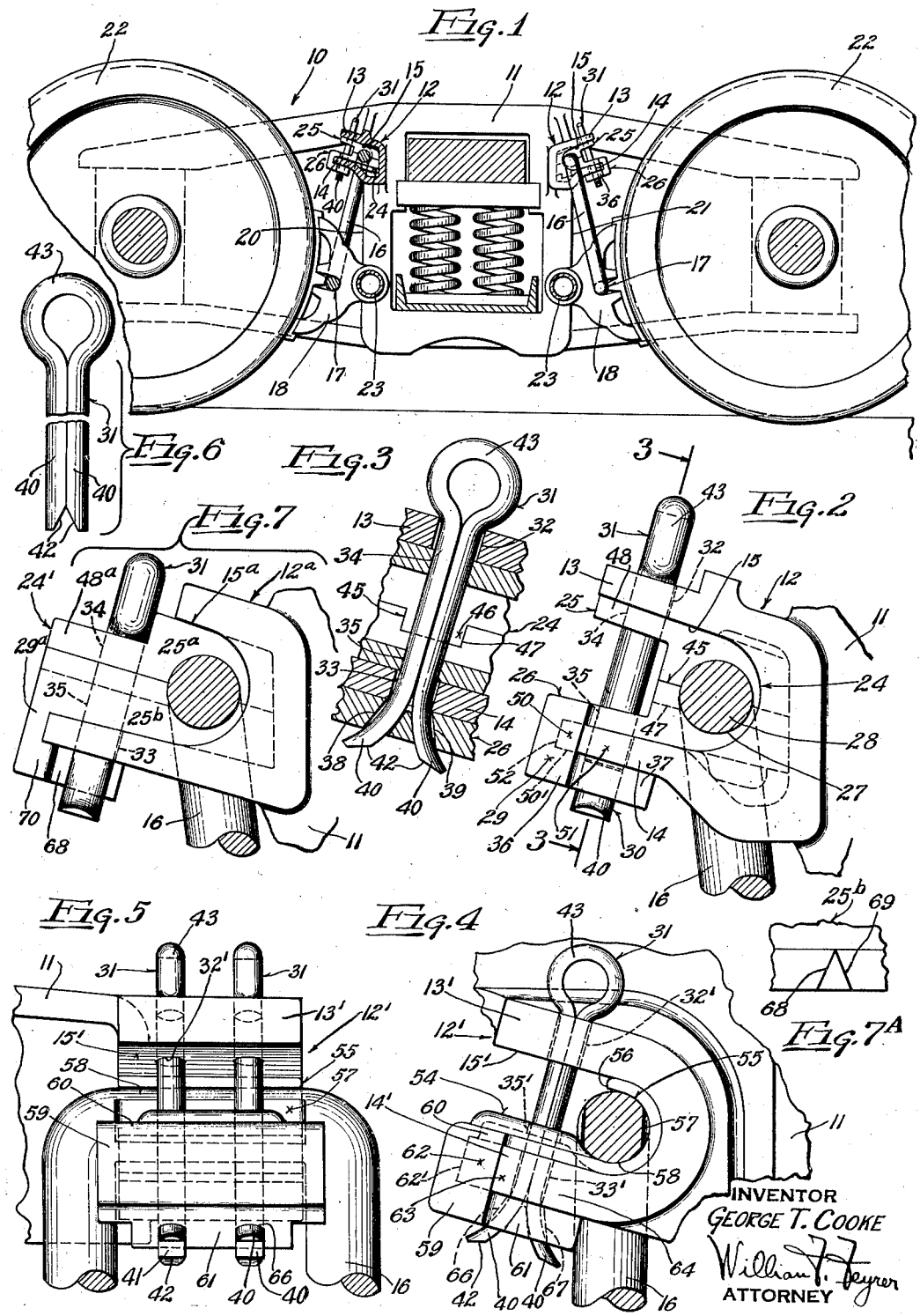
INVENTOR
GEORGE T. COOKE
ATTORNEY Patented Apr. 26, 1938

2,115,506

UNITED STATES PATENT OFFICE 2,115,506

BRAKE BEAM HANGER DEVICE

George T. Cooke, Norwalk, Conn., assignor to American Railway Products Co., Inc., Darien, Conn., a corporation of New York Application June 30, 1937, Serial No. 151,130

10 Claims. (Cl. 188—206)

The present invention relates to advantageous structures for securing brakes and brake beam hangers to truck frames, and particularly adapted to the closed link type of hangers.

In railway brake hanger constructions it is desirable that the hanger and its supporting means be constructed to provide long usage. Furthermore, the hanger and the bracket connection must be secure to prevent the brake and closely associated parts from dropping and thereby causing possible derailment and wreckage of the car or train.

Accordingly, it is an important object of the present invention to provide a railway brake hanger construction which will withstand hard usage for a comparatively long period of time, and to provide such a construction which will be securely maintained in place with resultant great safety which is very important in railroads and the like.

From an economical standpoint it is desirable that replaceable means be provided to reduce the wear on brake hanger supporting means and preferably such means should be replaceable without requiring disassembly of the railway car truck.

To this end the present invention provides a novel brake hanger construction wherein easily replaceable yet securely held bushings completely or substantially completely enclose a pivot section of a hanger to provide a substantial bearing. A coextensive advantage is that these easily replaceable and securely held bushings may, because they are small in size, be made of comparatively expensive wear resisting materials while the adjacent very large supporting parts are made of inexpensive material.

In some forms of brake beam hangers heretofore proposed it was not possible to uniformly distribute pressure and wear. As a consequence undue wear and short life resulted in the brake beam hanger and associated parts.

A further object of the present invention is to provide a bushing between the brake hanger and the car truck, which will be rotatively locked with respect to the latter in order to prevent wear thereof.

A still further object of the invention is to provide a sectional bushing adapted to be disposed between a brake hanger and a socket on the car frame to substantially surround said brake hanger, and which bushing may be readily placed in operative position therein and replaced for repairs or when worn.

Another object is to provide improved means for suspending or supporting railroad brakeshoes whereby it is possible to positively lock the hanger relative to the car frame and thereby increase the safety and also to rigidly maintain the joint wearing plates relative to the support to reduce wear and avoid rattling.

Features of the present invention flowing from the attainment of these objects include the provision of a novel brake beam hanger construction including: unusual and highly advantageous one-piece and two-piece bushings, either of which may be very easily removed and replaced when worn or to make repairs to other parts; a novel bushing and novel locking means therefor including a cotter pin with cooperating parts adapted to automatically spread the cotter pin and lock the bushing in place; socket means on a bushing for locating and holding it relative to the railway car truck and maintaining the latter in a predetermined position; and, novel structure for holding two parts of a split bushing together and to a truck frame.

These and other objects and features of the invention will be apparent to those skilled in the art from the following description and annexed drawing, in which:

Figure 1 is a side view of a railway car truck.

Fig. 2 is a side view of the novel bushing and locking means therefor applied to a fragment of a car truck.

Fig. 3 is a fragmentary sectional view taken on line 3—3 of Fig. 2.

Fig. 4 is a fragmentary view similar to Fig. 2 of a modified form of the present invention, including primarily a modified form of bushing or wearing plate.

Fig. 5 is a front view of that form of the invention shown in Fig. 4.

Fig. 6 is a view of the cotter member.

Fig. 7 is a side view of a modified form of the invention, similar to Fig. 2.

Fig. 7A is a fragmentary view of a modified form of spreading means.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring now in detail to the drawing, in Fig. 1 there is disclosed a car truck 10 including a main center section or truck frame 11, with longitudinally extending sockets 12 at each corner of the frame. The sockets are preferably made integral with the casting or forging forming the main frame 11, each preferably including a projecting upper finger 13 and lower finger 14 defining an aperture 15 adapted to receive a hanger 16 which at its lower end has a pivot connection 17 to a brakeshoe 18.

The hangers 16 may be of so-called loop, or of the U type with pivot pins, which are in extensive general use and well known. The brakeshoes may also be of any conventional and well-known type. In the usual construction found extensively on railroads at the present time truck frames 11 are provided with a pair of sockets at each of the opposite ends 20 and 21 adjacent coaxial wheels 22 in the well-known manner. Likewise the brake hanger construction at each end 20 and 21 includes a pair of hangers 16 and a pair of brakeshoes 18 adjacent each pair of wheels 22, preferably interconnected as by the rod 23 to move coordinately toward and from the wheels 22 when the brakeshoes are actuated by hand, steam or air in the usual manner.

Now of particular importance, and as can be seen best by viewing Figs. 2 and 3, the present invention provides a novel bearing for supporting the brake hangers 16. In its present preferred form this novel bearing comprises a bushing 24 preferably of split construction including an upper section 25 and a cooperating lower section 26 providing a bore 27 therebetween adapted to receive and support the hanger 16. This bushing, because it is small in size, may be made of special wear resisting materials to have long life, while the adjacent supporting truck frame 11 which is of very large size can be made of inexpensive and less wear resisting material. Because the bore 27 provides a complete bearing surface for the pivot 28 of the hanger a long life thereto is assured.

The exterior contour of the bushing 24 is generally much the same as the aperture 15 in the socket 12 in order to fit in a comparatively snug manner therein but so that it may be slidably withdrawn therefrom.

In order to prevent the bushing 24 from dropping out of the socket 12 and to prevent it from shifting therein the present invention provides a novel aligning or holding structure 29, and also a novel locking structure 30. In its present preferred form this locking mechanism includes a cotter member 31, see Figs. 2, 3, and 6, which may be passed through coextensive holes 32 and 33 in the top and bottom fingers 13 and 14 respectively and which concurrently may be passed through a specially provided hole 34 in the upper bushing part 25 and/or coextensive hole 35 in the lower section 26.

Of further importance, and forming a particular novel part of the present invention, the lower section 26 of the bushing 24 is provided with a looped finger 36 extending around the lower finger 14 of the socket 12 and having a return or outer end portion 37 underlying the lower finger 14. This end portion is provided with a pair of divergent bores 38 and 39 adapted to receive the prongs 40 of the cotter member 31 and to automatically spread and open the same as may be seen best in Fig. 3. Preferably the cotter is provided with a bevelled cut or aperture including flats 42 between the prongs 40 to facilitate properly aligning the cotter member 31 with the divergent bores 38 and 39 and to facilitate spreading the same as the top or looped end 43 of the cotter member is struck with a hammer or the like.

Thus, it will be apparent that it is only necessary to place bushing sections 25 and 26 around a pivot 28 of the hanger 16 and then slide such an assembly into the aperture 15 of the socket to effect the initial hookup. Thereafter, it is only necessary to slide a cotter pin 31 through the holes 32, 34, 35, and 33 in order to effect an initial fastening of the bushing 24 to the socket 12 of the car frame. To lock these members relative to each other it is merely necessary to strike the cotter member on the head 43 whereupon the divergent bores 38 and 39 automatically open the cotter prongs 40 to securely and permanently lock the same as may be seen best in Fig. 3.

After the cotter is so spread or locked in place there is never any possibility of inadvertent or accidental separation of the bushing 24 from the socket 12. Extensive and thorough effort must be made to actually retract or remove the cotter member 31 from the locking position either by pulling upon the loop or head section 43, as by passing a rod or other puller therein, and pulling upon the same, or by striking one or both of the prongs 40 at the lower end thereof. As the cotter member is thus forced backwardly in the holes 33, 35, 34, and 32 the divergent bores 38 and 39 serve to automatically close the prongs thereof again to facilitate its subsequent and final movement through said aforementioned holes.

In order to accurately align the two bushing sections 25 and 26 relative to each other and thereby insure a smooth travel of the cotter member 31 through mating or coaxial holes 32 to 34 and 35 to 33 the present invention provides a connection 45 including a tongue 46 and slot 47. Thus there is no actual transverse shifting of the two sections 25 and 26 relative to each other. If preferred, it is possible to dispense with the hole 34 in the upper member 25 for economy in manufacture and/or to dispense with the finger 48 of the upper section 25 and thereby cut down weight. The connection 45 effectively serves to prevent transverse shifting of the upper section relative to the lower section 26 so that the section 25 may not shift axially of the pivot 28 and out of the socket 12. The pivot 28 would prevent the section 25 from shifting longitudinally in the socket 12. In its preferred construction, however, the finger 48 and hole 34 are provided to more effectively lock the upper section 25 in place and to effectively lock the complete bushing 24 in place.

The present invention provides an effective medium for preventing transverse shifting of the bushing 24 in the socket 12, and for the further purpose of aligning holes 32 and 33 in the top and bottom fingers 13 and 14 respectively in the socket 12 with the holes 34 and 35 in the bushing 24 to facilitate passage of the cotter member therein and to prevent undue wear on the cotter member. For this purpose the present invention provides side walls 50 adapted to envelop side walls 51 on the lower finger 14. Thus, a forward end 52 on the lower finger 14 projects into a socket 50' provided in the lower section 26 of the bushing 24 to effectively align the socket 12, bushing 24 and cotter member 31 and to minimize wear on the latter.

Figs. 4 and 5 disclose a slightly modified form of the present invention differing from the form just described primarily in the provision of a one-piece bushing or wear plate 54 and the provision of a pair of cotter members 31 rather than only one. This wearing plate may be made from a forging, and also from malleable iron or steel castings or the like, including a bearing loop 55 with an opening 56 adapted to receive the hanger 16. Preferably the hanger 16 is provided with flats 57 which align with the opening 56 to facilitate entrance and the loop bearing 55 fully engages the semicircular sections 58 of the hanger after the latter is passed thereto.

The one-piece bushing 54 also includes a looped finger 59 with a main section 60 and a return bend section 61 at the underside thereof. This loop or return bend section 61 preferably includes side walls 62 forming a socket 62' adapted to receive a forward end 63 of the finger 64 section of the socket 12' to effectively prevent transverse shifting of the wearing plate or one-piece bushing 54 relative to the socket.

Similarly to the first form of the invention hereinbefore described in detail, the form of the invention disclosed in Figs. 4 and 5 includes the cotter member 31 projected through a suitable hole 32' in the upper finger 13', downwardly through a hole 35' in the main bushing section 60, and thence through a suitable hole 33' in the lower finger 14 of the truck frame 11. To this point the cotter member effectively locates and holds the wearing plate in an aperture 15' part of the socket 12'. It would serve this function effectively even though the side walls 62 and the socket 62' formed thereby were omitted. The latter, however, functions to align the various parts for the cotter member and to prevent the wearing plate from shifting, rattling or causing undue wear on the mating parts.

Coextensive with the holes 35' and 33' and in the return bend portion 61 of the one-piece bushing 54 the present invention includes the provision of a pair of divergent bores 66 and 67 adapted to receive the prongs 40 and to automatically spread and lock the same when the head 43 is driven into the lowered or locking position. Removal of the cotter member 31 is effected in the same manner as with the preferred form of the invention hereinbefore described in detail.

Fig. 7 discloses a modified form of the present invention, closest to that form of the invention disclosed in Figs. 1, 2, and 3, differing primarily in the omission of a long projecting upper finger 13 and consequently also lacking in a cotter member hole, such as the hole 32 in Fig. 2. This modified form, however, includes a bushing 24' slidable into a socket 15a. The bushing includes sections 25a and 25b each having fingers 48a and 29a with holes 34 and 35 respectively aligning with a hole 33 in the socket 12a and with divergent walls 68 and 69 to be spread by the latter. This form of construction is more economical to manufacture and increases the free space for applying a hammer or other tool to the head of the cotter member.

The lower or outer end of the finger 70 of the bushing 24' may instead of divergent walls 68 and 69 (see Fig. 7A) be provided with divergent bores, such as the bores 38 and 39 hereinbefore described in detail.

Other variations and modifications may be made within the scope of this invention, and portions of the improvements may be used without others.

Having thus described the invention, what is claimed as new is:

1. A brake hanger support consisting in the combination of a truck frame having an upper and a lower finger forming a socket; a split bushing fitting into said socket, and having a bore; a hanger fitting into said bore; means on said bushing extending around at least one of said fingers and having a pair of divergent bores; and a cotter member passable through at least one of said fingers and into engagement with the divergent bores to be spread by the latter and to thereby lock the bushing in the socket.

2. A brake hanger support consisting in the combination of a truck frame having an upper and a lower finger forming a socket; a split bushing fitting into said socket, and having a bore; a hanger fitting into said bore; means on said bushing extending around at least one of said fingers and having a pair of divergent bores; side walls on said means engaging the finger, to prevent transverse shifting; and a cotter member passable through at least one of said fingers and into engagement with the divergent bores to be spread by the latter and to thereby lock the bushing in the socket.

3. A brake hanger support comprising the combination of a truck frame having an upper and a lower finger forming a socket; a split bushing fitting into said socket, and having a bore; a tongue and slot connection for locking said split bushing together; a hanger fitting into said bore; means on said bushing extending around at least one of said fingers and having a pair of divergent bores; and a cotter member passed through at least one of said fingers and into engagement with the divergent bores where it is spread to lock the bushing in the socket.

4. A brake hanger support comprising the combination of a truck frame having an upper and a lower finger forming a socket; a split bushing fitting into said socket, and having a bore; means for locking said split bushing together; a hanger fitting into said bore; means on said bushing extending around at least one of said fingers and having a pair of divergent bores; and a cotter member passed through at least one of said fingers and into engagement with the divergent bores where it is spread to lock the bushing in the socket.

5. A brake hanger support including the combination of a truck frame having an upper and a lower finger forming a socket, each of said fingers being provided with coextensive holes; a split bushing fitting into said socket, and having a bore; a hanger fitting into said bore; means on said bushing extending around at least one of said fingers, and having a pair of divergent bores; and a cotter member passed through the holes in said fingers and into the divergent bores in said bushing where it is spread by the latter to lock the bushing in the socket.

6. A brake hanger support including the combination of a truck frame, having an upper and a lower finger forming a socket, at least one of said fingers being provided with an aperture; a split bushing including an upper member and a lower member adapted to fit into said socket, and an aperture in at least one of said members; means on at least one of said bushing members extending around at least one of said fingers, and having a pair of divergent bores; and a cotter member passable through the apertures in said finger and the bushing member, to hold the bushing in the socket, and into the divergent bores to be spread thereby.

7. A brake hanger support including the combination of a truck frame having an upper and a lower finger forming a socket and coextensive holes in said fingers; a hanger; a bushing adapted to fit into said socket, having a bore accommodating said hanger; a finger on said bushing extending around at least one of the fingers of the socket, having a hole and a pair of divergent bores; side walls on said bushing finger; and a cotter member adapted to be passed through the holes in the socket and bushing fingers into registry with the divergent bores to be spread by the latter.

8. A brake hanger support including the combination of a truck frame having an upper and a lower finger forming a socket, and an aperture in at least one of said fingers; a hanger; a bushing adapted to fit into said socket, and having a bore accommodating said hanger; a finger on said bushing extending around at least one of the fingers of the socket and having a pair of divergent bores; and a cotter member adapted to be passed through said aperture and spread by said divergent bores to lock said bushing in the socket.

9. A brake hanger support including the combination of a truck frame having an upper and a lower finger forming a socket, and an aperture in at least one of said fingers; a hanger; a bushing adapted to fit into said socket, having a bore accommodating said hanger; a finger on said bushing extending around at least one of the fingers of the socket and having a pair of divergent bores; side walls on said bushing finger; and a cotter member adapted to be passed through said aperture and spread by said divergent bores to lock said bushing in the socket.

10. A brake hanger support including the combination of a truck frame having an upper and a lower finger forming a socket, and an aperture in at least one of said fingers; a hanger; a bushing adapted to fit into said socket, having a bore accommodating said hanger; a finger on said bushing extending around at least one of the fingers of said socket; spreading means on said bushing finger; and a cotter member adapted to be passed through said aperture and opened by said spreading means to lock said bushing in the socket.

GEORGE T. COOKE.